United States Patent
Harris et al.

(10) Patent No.: US 6,776,729 B2
(45) Date of Patent: Aug. 17, 2004

(54) GOLF BALLS WITH SILICONE-UREA COPOLYMERS

(75) Inventors: Kevin M Harris, New Bedford, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/274,799

(22) Filed: Oct. 21, 2002

(65) Prior Publication Data

US 2003/0114624 A1 Jun. 19, 2003

Related U.S. Application Data

(60) Provisional application No. 60/348,496, filed on Oct. 22, 2001.

(51) Int. Cl.⁷ .............................................. A63B 37/12
(52) U.S. Cl. ........................ 473/378; 473/374; 528/28
(58) Field of Search ........................... 528/28; 473/378, 473/374

(56) References Cited

U.S. PATENT DOCUMENTS

| | | | |
|---|---|---|---|
| 4,675,361 A | 6/1987 | Ward, Jr. ...................... | 525/92 |
| 5,221,724 A | 6/1993 | Li et al. ........................ | 528/28 |
| 5,428,123 A | 6/1995 | Ward et al. ................... | 128/28 |
| 5,461,134 A | 10/1995 | Leir et al. ..................... | 528/14 |
| 5,484,870 A * | 1/1996 | Wu ............................. | 528/28 |
| 5,530,083 A | 6/1996 | Phelps et al. ................. | 528/25 |
| 5,589,563 A | 12/1996 | Ward et al. ................... | 428/44 |
| 5,863,627 A | 1/1999 | Szycher et al. ............ | 428/36.8 |
| 6,159,110 A | 12/2000 | Sullivan et al. ............. | 473/374 |
| 6,162,134 A | 12/2000 | Sullivan et al. ............. | 473/373 |
| 6,204,331 B1 | 3/2001 | Sullivan et al. ............. | 525/221 |
| 6,207,784 B1 * | 3/2001 | Rajagopalan ................ | 528/71 |

* cited by examiner

Primary Examiner—Margaret G. Moore
(74) Attorney, Agent, or Firm—D. Michael Burns

(57) ABSTRACT

A golf ball comprising a cover and a core, and optionally at least one intermediate layer interposed between the cover and the core, wherein the cover, the intermediate layer or both are formed from a blend comprising a silicon-urea copolymer.

29 Claims, 1 Drawing Sheet

GOLF BALLS WITH SILICONE-UREA COPOLYMERS

CROSS-REFERENCE TO RELATED APPLICATION

This application claims priority to Provisional Patent Application Serial No. 60/348,496 filed Oct. 22, 2001.

FIELD OF THE INVENTION

The present invention relates to golf balls. More specifically, to the use of silicone-urea copolymer materials in a golf ball cover, core and intermediate layers between the cover and the core for improving golf ball physical properties.

BACKGROUND OF THE INVENTION

Conventional golf balls can be divided into two general types or groups: solid balls and wound balls. The difference in play characteristics resulting from these different types of constructions can be quite significant.

Balls having a solid construction are generally most popular with the average recreational golfer because they provide a very durable ball while also providing maximum distance. Solid balls are generally made with a single solid core, usually made of cross-linked rubber, which is encased by a cover material. Typically the solid core is made of polybutadiene which is chemically cross-linked with zinc diacrylate and/or similar cross-linking agents and is covered by a tough, cut-proof blended cover. The cover is generally a material such as SURLYN®, which is a trademark for an ionomer resin produced by DuPont. The combining of the core and cover materials provides a ball that is virtually indestructible by golfers. Further, such a combination imparts a high initial velocity to the ball that results in improved distance. Because these materials are very rigid, two-piece balls have a hard "feel" when struck with a club. Likewise, due to their hardness, these balls have a relatively low spin rate, which provides greater distance.

Wound balls typically have either a solid rubber or liquid center core around which many yards of a stretched elastic thread or yarn are wound. The wound core is then covered with a durable cover material such as ionomer or polyurethane. Wound balls are generally softer and provide more spin, which enables a skilled golfer to have control over the ball's flight and final position. Particularly, with approach shots into the green, the high spin rate of soft, wound balls enables the golfer to stop the ball very near its landing position.

The design and technology of golf balls has advanced to the point whereby the United States Golf Association has now instituted a rule that prohibits the use, in a USGA sanctioned event, of any golf ball which can achieve an initial velocity of 255 ft/s when struck by a implement having a velocity of 143 ft/s. (Herein referred to as the USGA test.)

Manufacturers place a great deal of emphasis on producing golf balls that consistently achieve the highest possible velocity in the USGA test without exceeding the limit, which are available with a range of different properties and characteristics, such as velocity spin and compression. Thus, a variety of different balls are available to meet the needs and desires of a wide range of golfers.

Regardless of the form of the ball, players generally seek a golf ball that delivers maximum distance, which requires a high initial velocity upon impact. Therefore, in an effort to meet the demands of the marketplace, manufacturers strive to produce golf balls with high initial velocities.

As a result, golf ball manufacturers are continually searching for new ways in which to provide golf balls that deliver the maximum performance for golfers at all skill levels, and seek to discover compositions that provide the performance of a high compression ball with lower compression. For example, U.S. Pat. No. 5,484,870 issued to Shenshen Wu, that teaches polyurea compositions that can be used for a golf ball cover.

The physical characteristics of a golf ball are determined by the combined properties of the core, any intermediate layers, and the cover. These, in turn, are determined by the chemical compositions of each. The composition of some balls will provide for increased distance. Other compositions provide for improved spin. Manufacturers are constantly looking to develop the ideal materials, silicone elastomers for example, have been examined for their innate ability to provide material having fairly high ultimate elongation, which is a very desired property in the make-up of a golf ball. However, they also have only low-moderate tensile strengths. One of the least attractive properties of silicone elsatomers in the manufacture of golf balls is that the materials require covalent cross-linking to develop useful properties. This is because linear or branched silicone (polydimethylsiloxane)(PSX) homopolymers are viscous liquids or millable gums at room temperature. Fabrication of these materials must include, or be followed by, cross-linking to form chemical bonds among adjacent polymer chains. The infinite network thus formed gives the polymer its rubber elasticity and characteristic physical-mechanical properties. Cross-linking of extrudable and moldable silicone stock is usually done via peroxide-generated free radicals adding to vinyl groups incorporated along the polymer backbone, or increasingly, by the platinum-catalyzed addition of silane (—Si—H) terminal vinyl groups. Certain low-strength (RTV) silicone adhesives vulcanize at room temperature by condensation reactions, eliminating an acid or alcohol to generate —Si—OH or silanols, followed by the elimination of water as silanols condense to form —Si—O—Si— (siloxane) bonds and create a three-dimensional network.

Regardless of how the cross-linking or vulcanization is effected, the resulting thermoset silicone cannot be re-dissolved or re-melted. This severely reduces the number of post-fabrication operations that could be used in the fabrication process of golf balls. Thermal forming, radio frequency welding, heat sealing and solvent bonding are all essentially unavailable when working with conventional silicone elastomers.

Therefore, despite the prior-art on several conventional polyurea polymers, there exists a need for a golf ball comprising a silicone-urea having improved golf ball performance.

SUMMARY

The invention is related to a use of a silicone-urea material for forming golf balls. More particularly, the present invention is directed to the use of silicone-urea copolymers and blends containing silicone-urea in the formation of a golf ball core, cover or intermediate layer.

A first embodiment is a golf ball comprised of a core and a cover, one of which comprises an aromatic or aliphatic urea hard segment with a silicone based soft segment to create a silicone-urea copolymer. Preferably the core or cover is comprised of a silicone-polyether urea copolymer.

A second embodiment of the invention combines the above hard and soft segments with a polycarbonate to form a silicone-polycarbonate urea copolymer.

Another embodiment of the invention combines the above hard and soft segments with a polyethylene oxide to form a thermoplastic silicone-polyethyleneoxide urea copolymer.

Other embodiments of the invention include blends of silicone-polyurea with at least one thermoplastic or thermoset polymer including ionomers, including highly neutralized ionomers, non-ionomers, polyurethane, epoxy, styrenic, olefinic homo and copolymers (including metallocenes and single-site), polyamides, polyester, polyimide, polydiene, block copolymers of polyether (or ester)-ester, polyether (or ester)-amide and suitable compatibilizers.

The invention is either a two-piece or a multi-layered golf ball having a coefficient of restitution greater than about 0.7 and an Atti compression of at least about 50. Preferably the cover is a silicone-urea copolymer having: a material tensile strength of greater than about 1,000 psi, and preferably between about 1000 psi to 5000 psi; an ultimate elongation greater than about 40%, and preferably between about 400 to 800%; and an initial modulus from about 300 psi to 80,000 psi, preferably from about 10,000 psi to 80,000 psi.

In preferred embodiments of the present invention, the silicone-urea copolymers have a silicone content from 0.1% to 60% of by weight of polymer. More preferably, the silicone-urea copolymers have a silicone content of between about 1% and 20%.

A preferred embodiment is a golf ball wherein one of the ball components is comprised of a thermoplastic silicone-urea copolymer composition consisting of methane bis (4-phenylisocynate) (MDI), or hydrogenated MDI ($H_{12}$-MDI), 3-hydroxypropyl terminated polydimethylsiloxane, and an amine. A suitable catalyst would be used in the preparation.

A golf ball utilizing the compositions of the present invention will target the most favorable properties of both silicones and ureas, wherein the strengths of each material can be maximized.

DETAILED DESCRIPTION OF EMBODIMENTS

Figure 1:
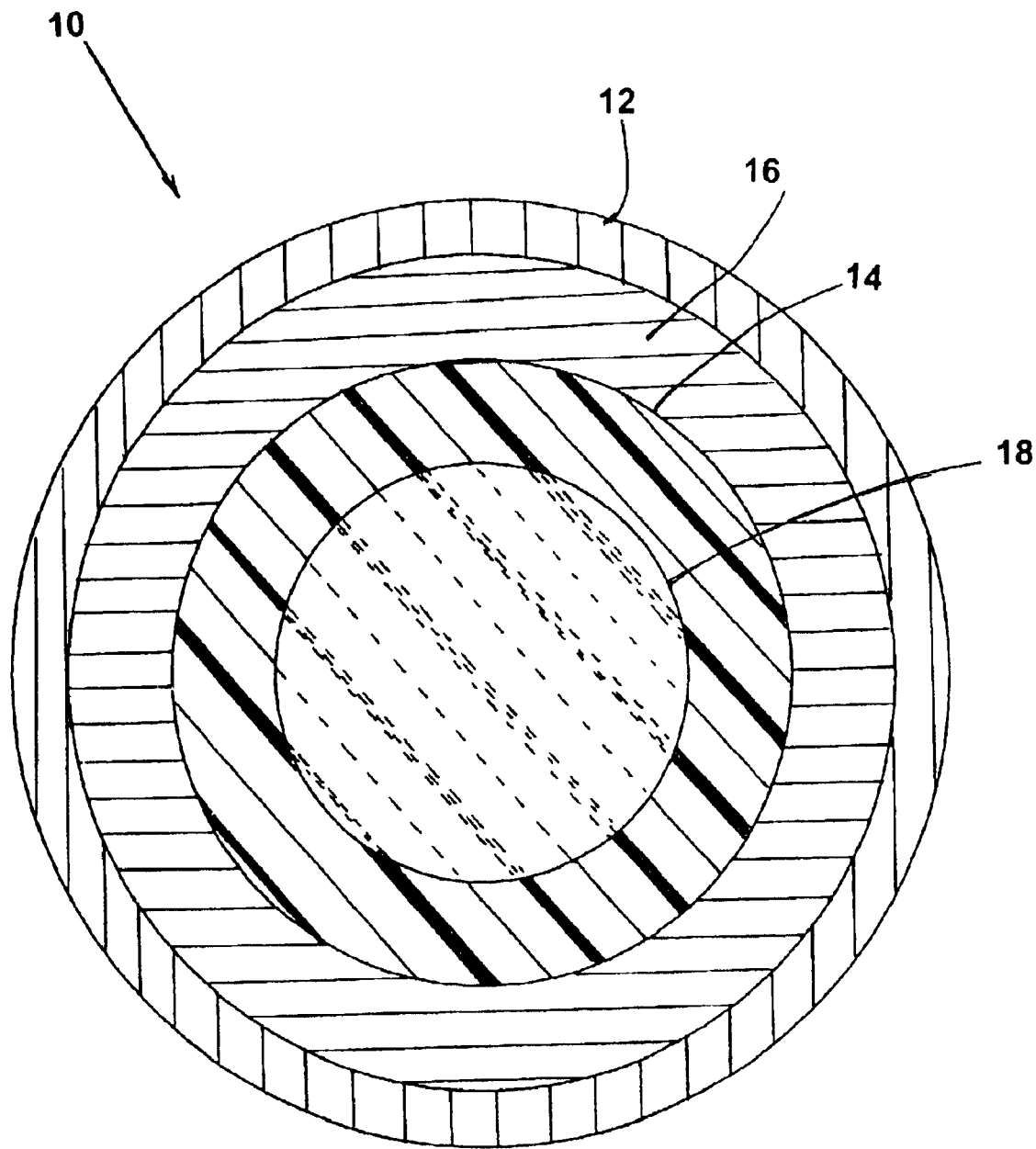
FIG. 1 is a cross-sectional view of a golf ball of the present invention.

In FIG. 1, the golf ball 10 of the invention comprises a cover 12 of at least one layer, a core 14 of at least one layer, and may optionally include at least one intermediate layer 16 between the cover 12 and the core 14, any part of which may contain a silicon-urea copolymer having silicone in the soft segment of the copolymer. The core may have a center 18 that is solid, hollow, fluid filled or gel filled. The layers of the ball 10 may also include a tensioned elastomeric material.

Further compositions may also be added to the silicone-urea copolymer, such as, for example, suitable compatibilizers, coloring agents, reaction enhancers, cross-linking agents, blowing agents, dyes, lubricants, fillers (including density modifying fillers), excipients, process aids and other compounds commonly added to polymeric materials and/or golf ball compositions.

The composition of any golf ball component, which does not contain the silicone-urea copolymers of the present invention disclosed herein, can be any such composition known to those of ordinary skill in the art. Such a composition may be readily selected by those of ordinary skill in the art. The resultant golf balls typically have a coefficient of restitution of greater than about 0.7, preferably greater than about 0.75, and more preferably greater than about 0.78 when tested at a initial velocity of 125 ft/sec. The golf balls also typically have a compression of at least about 40, preferably from about 50 to 120, and more preferably about 60 to 100. As used herein, the term "compression" means as measured by an ATTI Compression Gauge. These gauges are well known to those of ordinary skill in the art and are commercially available from Atti Engineering Corp. of Union City, N.J.

The present invention relates to golf balls of any size. While USGA specifications limit the size of a competition golf ball to more than 1.68 inches in diameter, golf balls of any size can be used for leisure golf play. The preferred diameter of golf balls is from about 1.68 inches to about 1.76 inches. A diameter of from about 1.68 inches to about 1.74 inches is most preferred. The core of the ball has a diameter from about 1.0 to about 1.62 inches. The cover of the golf balls typically has a thickness of at least about 0.03 inches. The cover of the present invention is preferably 0.02 to 0.15 inches, and more preferably from about 0.03 to 0.10 inches. Golf balls also typically have at least about 60 percent dimple coverage, preferably at least about 70 percent dimple coverage, of the surface area. The cover layer has a Shore D hardness of at least 20 and preferably between about 30 to 65. The golf ball of the present invention has a compression of less than 120.

Silicone-urea copolymers can have a silicone content in the range from less than 1 percent up to the total soft-segment content of the polymer, which can be from 20 to 65 percent depending on copolymer hardness. The silicone containing urea copolymers can demonstrate previously unavailable combinations of properties. For example, aromatic silicone-urea should have a higher modulus at a given Shore hardness than do conventional ureas: the higher the silicone content, the higher the modulus. (See Table 1 below.) The aliphatic silicone-ureas should also have a very low modulus and high ultimate elongation, which is typical of silicone homopolymers or even natural rubber. (See Table 2 below.) It is preferred that the silicone-urea copolymers of the present invention exhibit tensile strengths of at least 300 psi and preferably at least 1000 to 20,000 psi. Preferably, the urea copolymers have a combination of toughness (high tensile strength and elongation) and very low initial modulus. The ultimate elongation of the present invention is about 20 to 1000% with a preferred elongation of about 400 to 800%. The initial modulus of the present invention is about 300 to 150,000 psi and preferably between 10,000 to 80,000 psi.

Thus, silicone-urea copolymers are very attractive as high-performance substitutes for conventional cross-linked silicone elastomers. Depending on silicone content, modulus can be as low as that of natural rubber latex, with tensile strength equal or greater than that of natural rubber. Increased modulus in the aromatic series is due to enhanced hard-segment/soft segment phase separation resulting from the very low solubility parameter of silicone. The converse may be true in the case of aliphatic hard segments, which appear to be more compatible with soft segments containing silicone. In both aromatic and aliphatic silicone-urea copolymers, optical transparency should be available over a wide range of total silicone concentration: less than 1 and greater than 65 percent by weight. This is quite different from typical optical properties of hybrid or interpenetrating network systems, in which the gross phase separation of silicone often results in opacity to visible light. This is a very desired property in the use of ball covers. Many of the synergistic benefits of silicone are obtained at low to moderate silicone concentrations, which can preserve the mechanical strength of the parent polyurea. Generally, the greater the content of silicone, the lower the tensile strength.

U.S. Pat. Nos. 5,863,627 and 5,530,083, issued to Ward and which are incorporated by reference herein in their entirety, describe in great detail how the commercially available polyurethane products PurSil™, CarboSil™ and Hydrosil™ are processed. The high-strength thermoplastic elastomers containing silicone in the soft segment, such as that described by PurSil™ and shown in Table 1, are prepared through a multi-step bulk synthesis. In this synthesis the hard segment is an aromatic urethane MDI (4,4'-diphenylmethane diisocynanate-butanediol) with a low molecular weight glycol extender BD (butanediol) and the soft segment is comprised of polytetramethylene oxide (PTMO) including polydimethylsiloxane (PSX).

In addition to polydimethylsiloxane (PSX) other suitable Surface-Modifying End Group (SMEs) which may be used alone or in combination with one another include hydrocarbons, fluorocarbons, fluorinated polyethers, polyalkylene oxides, various sulphonated groups, and the like. SMEs are surface-active oligomers covalently bonded to the base polymer during synthesis. When the aromatic or aliphatic urea hard segment is combined with a hydrocarbon soft segment SME a hydrocarbon-polyurea is produced.

The use of surface modifying additives (SMAs) blended with the base polymer before fabrication is well known in the art. During and after fabrication, the SMA migrates to the surface in high concentration. This dramatically changes the outermost molecular monolayers to produce a desired surface quality.

BioSpan®, as manufactured and sold by The Polymer Technology Group, Inc., exhibits properties similar to Lycra®. It combines an aromatic urea hard segment with either a polyether soft segment to form BioSpan® SPU or a polycarabonate soft segment to form BioSpan® C. U.S. Pat. No. 5,221,724 issued to Li et al. and U.S. Pat. No. 5,461,134 issued to Leir et al. and which are incorporated by reference herein in their entirety, describe materials made from polysiloxane polyurethane-urea.

Polyurethane material properties of materials containing silicone soft segments like the materials of the present invention are set forth below:

TABLE 1

PurSil (From Aromatic Urethane)

| Property | Comparative Example 0% Si | PurSil ™ 10% Si | PurSil ™ 20% Si | PurSil ™ 40% Si | PurSil ™ 60% Si |
|---|---|---|---|---|---|
| Hard Segment | MDI-BD | MDI-BD | MDI-BD | MDI-BD | MDI-BD |
| Organic Soft Segment | PTMO | PTMO | PTMO | PTMO | None* |
| Tensile Strength (psi) | 5700 | 6515 | 5710 | 3930 | 2275 |
| Ultimate Elongation (%) | 815 | 760 | 665 | 580 | 410 |
| Initial Modulus (psi) | 2785 | 2880 | 2930 | 3510 | 4920 |

Note:
The percent silicone is amount added to PTMO soft segment.
*PurSil ™ 60 has 60% of silicone as the total soft segment.

In Table 2, the hard segment synthesis incorporates an aliphatic urethane HMDI-BD (dicyclohexylmethane 4,4'-diisocyanate) and the low molecular weight glycol extender BD.

TABLE 2

Pursil (From Aliphatic Urethane)

| Property | Comparative Example 0% Si | Pursil ™ 5% Si | Pursil ™ 10% Si |
|---|---|---|---|
| Hard Segment | HMDI-BD | HMDI-BD | HMDI-BD |
| Organic Soft Segment | PTMO | PTMO | PTMO |
| Tensile Strength (psi) | 5570 | 6225 | 6255 |
| Ultimate Elongation (%) | 715 | 810 | 835 |
| Initial Modulus (psi) | 1240 | 465 | 370 |

Note:
Percent silicone is amount added to PTMO soft segment.

In Table 3, the synthesis process is carried out wherein a hydroxyl-terminated polycarbonate (PC) is substituted in the soft segment for the PSX and PTMO. This is the CarboSil™ product, which along with PurSil™ can be fabricated by conventional extrusion, injection molding or compression molding techniques.

TABLE 3

CarboSil

| Property | Comparative Example 0% Si | CarboSil 10% Si | CarboSil 20% Si | CarboSil 40% Si |
|---|---|---|---|---|
| Hard Segment | MDI-BD | MDI-BD | MDI-BD | MDI-BD |
| Organic Soft Segment | PC | PC | PC | PC |
| Tensile Strength (psi) | 7270 | 7140 | 5720 | 3250 |
| Ultimate Elongation (%) | 580 | 500 | 480 | 305 |
| Initial Modulus (psi) | 1170 | 6260 | 4125 | 6402 |

The silicone-urea materials are preferably heat-sealable, readily blended with fillers, and easily post-formed. Melt processing conditions are similar to conventional polyurea. Since polyureas are generally hydrophilic materials, pellets should be dried in a desiccant-bed-type dehumidifying hopper dryer prior to processing. The final moisture content should be less than 0.01%.

Golf balls of the present invention can be manufactured by numerous methods. The core may be made by methods well known in the art, by using either a conventional wound core construction, or a conventional solid construction of one or more layers. The wound core construction can be either a solid rubber-based center or a liquid filled center, around which a length of elastic thread is wound. A conventional solid construction preferably comprises a cis 1,4 polybutadiene rubber that has been cross-linked with a metal salt of an unsaturated fatty acid such as zinc diacrylate. A conventional multi-layer construction may include multi-layered cores of different polybutadiene based materials to form inner and outer layers.

These core constructions are then covered using conventional compression molding, or injection molding or casting techniques with a cover formulation containing a thermoplastic silicone-urea copolymer as discussed above. There are many methods to utilize this material. One example includes a copolymer of silicone-polyurea being formed over a core by a one-shot (or alternately a pre-polymer approach) process. This is done by intimately mixing 0.05 mole of methane bis (4-phenylisocynate) (MDI), 0.015 mole of 3-hydroxypropyl terminated polydimethylsiloxane (molecular weight about 1000) and 0.035 mole of amine such as clear link 1000 and a suitable catalyst and elevated temperatures if needed. The cover is preferably between about 0.03 and 0.10 inches thick.

In another embodiment, the copolymer of silicone-polyurea is blended with at least one thermoplastic or thermoset polymer, including ionomers and their acid polymers including highly neutralized polymers, polyolefins, polyacrylates, polyamides, polyphenylene oxide, polyisoprene, block copoly (ether or ester-amide), block copoly (ether or ester-ester), polysulfones, reaction injection moldable thermoplastic and thermoset polymers, block copolymer of styrene-butadiene and its hydrogenated derivatives, dynamically vulcanized ethylene-propylene rubber, polyvinylidenefluoride, acrylonitrile-butadiene styrene copolymer, polyurethanes, epoxy resins, polystyrenes, acrylics, polyethylenes, polyamides, polybutadienes and polyesters.

Another embodiment is made up of a core, an inner cover having a flexural modulus greater than 50,000 psi and a cover comprised of thermoplastic silicone-urea copolymers. The cover is preferably about 0.02 to 0.05 inches thick and can have an initial modulus of less than 10,000 psi.

Another embodiment has a core, cover and intermediate layer of silicone-urea copolymers. The core preferably has a diameter of at least 1.5 inches. The intermediate layer is preferably about 0.02 to 0.08 inches thick. The cover is preferably a thermoset or thermoplastic material such as polyurethane, polyurea, ionomer and other elastomers. The polybutadiene rubber composition of the core preferably comprises at least 2.2 pph of a halogenated organosulfur compound, preferably zinc pentachlorothiophenol.

While it is apparent that the invention disclosed herein is well calculated to fulfill the objects stated above, it will be appreciated that numerous modifications and embodiments may be devised by those skilled in the art. Such modifications may include density modifying additives, UV absorbing additives, foamed layers, moisture barrier layer, hindered amine light stabilizers, optical brighteners etc. In addition to its use in a golf ball, the present invention can be used in other golf equipment such as inserts in golf clubs. Therefore, it is intended that the appended claims cover all such modifications as falling within the true spirit and scope of the present invention.

What is claimed is:

1. A golf ball comprising:
a core of at least one layer;
a cover of at least one layer disposed concentrically about the core;
at least one of the cover or the core is comprised of a silicone-urea copolymer; and
the silicone-urea copolymer comprises a polycarbonate soft segment with a silicone moiety.

2. The golf ball according to claim 1, wherein the silicone-urea copolymer has an ultimate elongation of at least 40%.

3. The golf ball according to claim 1, wherein the silicone-urea copolymer has a tensile strength of at least 300 psi.

4. The golf ball according to claim 1, wherein the silicone-urea copolymer has an initial modulus less than 10,000 psi.

5. The golf ball according to claim 1, wherein the silicone-urea copolymer has an initial modulus of between 10,000 and 80,000 psi.

6. The golf ball according to claim 1, wherein the silicone-urea copolymer has a Shore D hardness from about 30 to 65.

7. The golf ball according to claim 1, wherein the cover layer has a thickness of from about 0.02 to 0.125 inches.

8. The golf ball according to claim 1, wherein the golf ball has a compression of less than 120.

9. The golf ball according to claim 1, wherein the core has a diameter from about 1.0 to about 1.62 inches.

10. The golf ball according to claim 1, wherein the thermoplastic silicon-urea copolymer is blended with at least one thermoplastic or thermoset polymer selected from the group consisting of ionomers and their acid polymers including highly neutralized acid polymers, polyurethane, polyolefins, polyacrylates, polyamides, polyphenylene oxide, polyisporene, block copoly (ether or ester-amide), block copoly (ether or ester-ester), polysulfones, reaction injection moldable thermoplastic and thermoset polymers, block copolymer of styrene-butadiene and its hydrogenated derivatives, dynamically vulcanized ethylene-propylene rubber, polyvinylidenefluoride, acrylonitrile-butadiene styrene copolymer, epoxy resins, polystyrenes, acrylics, polybutadienes and polyester.

11. The golf ball according to claim 1, wherein the silicone-urea copolymer includes a surface modifying additive.

12. The golf ball according to claim 1, wherein the silicone-urea has a silicone content in an amount between about 0.1 percent to 60 percent of copolymer by weight.

13. The golf ball according to claim 12, in which the silicone content is present in an amount between about 1 percent to 20 percent.

14. The golf ball according to claim 13, wherein the thermoplastic silicon-urea copolymer is blended with at least one thermoplastic or thermoset polymer selected from the group consisting of ionomers and their acid polymers including highly neutralized acid polymers, polyurethane, polyolefins, polyacrylates, polyamides, polyphenylene oxide, polyisoprene, block copoly (ether or ester-amide), block copoly (ether or ester-ester), polysulfones, reaction injection moldable thermoplastic and thermoset polymers, block copolymer of styrene-butadiene with its hydrogenated derivatives, dynamically vulcanized ethylene-propylene rubber, polyvinylidenefluride, acrylonitrile-butadiene styrene copolymer, epoxy resins, polystyrenes, acrylics, polybutadienes and polyesters.

15. A golf ball comprising:
a core of at least one layer;
a cover of at least one layer disposed concentrically about the core;
at least one intermediate layer interposed between the core and the cover;
at least one of the core, or the cover or the at least one intermediate layer is comprised of a silicone-urea copolymer; and
the silicone-urea copolymer comprises a polycarbonate soft segment with a silicone moiety.

16. The golf ball according to claim 15, wherein the silicone-urea copolymer includes a surface modifying additive.

17. The golf ball according to claim 15, wherein the silicone-urea has a silicone content in an amount between about 0.1 percent to 60 percent of the copolymer by weight.

18. The golf ball according to claim 17, wherein the silicone content is present in an amount between about 1 percent to 20 percent.

19. The golf ball according to claim 15, wherein the at least one intermediate layer is comprised of a tensioned elastomeric material.

20. The golf ball according to claim 15, wherein the cover has a thickness of about 0.02 inches to about 0.125 inches.

21. The golf ball according to claim 15, wherein the thickness of the at least one intermediate layer is about 0.02 inches to about 0.08 inches.

22. The golf ball according to claim 15, wherein the core has a diameter of at least about 1.55 inches.

23. The golf ball according to claim 15, wherein the silicone-polyurea composition comprises a UV absorber.

24. The golf ball according to claim 15, wherein the silicone-polyurea composition comprises a hindered amine light stabilizer.

25. The golf ball according to claim 15, wherein the silicone-polyurea composition comprises an optical brightener.

26. The golf ball of claim 15, wherein the intermediate layer is comprised of the silicone-urea copolymer and the cover is comprised of a thermoset material.

27. The golf ball of claim 15, wherein the intermediate layer is comprised of the silicone-urea copolymer and the cover is comprised of a thermoplastic material.

28. A golf ball comprising:
   a core of at least one layer;
   a cover of at least one layer disposed concentrically about the core;
   at least one of the cover or the core is comprised of a silicone-urea copolymer; and
   the silicone-urea copolymer comprises a polyester soft segment with a silicone moiety.

29. A golf ball comprising:
   a core of at least one layer;
   a cover of at least one layer disposed concentrically about the core;
   at least one intermediate layer interposed between the core and the cover;
   at least one of the core, or the cover or the at least one intermediate layer is comprised of a silicone-urea copolymer; and
   the silicone-urea copolymer comprises a polyester soft segment with a silicone moiety.

* * * * *